US006076244A

United States Patent [19]

Okumura et al.

[11] Patent Number: 6,076,244

[45] Date of Patent: Jun. 20, 2000

[54] HEAT TREATMENT METHOD OF ACTUATORS FOR AN INK JET PRINTER HEAD AND METHOD FOR MANUFACTURING AN INK JET PRINTER HEAD

[75] Inventors: Motonori Okumura; Takaichi Wada; Tadao Furuta, all of Suwa; Shinsuke Yano, Nagoya; Tomohiro Yamada, Komaki; Nobuo Takahashi, Owariasahi, all of Japan

[73] Assignees: Seiko Epson Corporation; NGK Insulators, Ltd., both of Japan

[21] Appl. No.: 09/190,464

[22] Filed: Nov. 12, 1998

[30] Foreign Application Priority Data

Nov. 17, 1997 [JP] Japan .................................... 9-315267

[51] Int. Cl.[7] ............................ H04R 17/00; B32B 31/14

[52] U.S. Cl. ........................ 29/25.35; 29/890.1; 156/247; 264/620

[58] Field of Search ............................... 29/890.1, 25.35, 29/593; 156/247; 427/100, 385.5; 264/620, 618

[56] References Cited

U.S. PATENT DOCUMENTS

| | | | |
|---|---|---|---|
| 4,568,384 | 2/1986 | Maher | 29/25.42 |
| 4,759,816 | 7/1988 | Kasper et al. | 156/247 |
| 4,793,883 | 12/1988 | Sheyon et al. | 156/247 |
| 5,430,344 | 7/1995 | Takeuchi et al. | 310/330 |
| 5,485,185 | 1/1996 | Sueoka et al. | 347/64 |
| 5,572,244 | 11/1996 | Drake et al. | 29/890.1 |
| 5,622,748 | 4/1997 | Takeuchi et al. | 29/25.35 |
| 5,755,909 | 5/1998 | Gailus | 29/25.35 |
| 5,825,121 | 10/1998 | Shimada | 29/25.35 |
| 5,874,126 | 2/1999 | Kahn et al. | 427/100 |
| 5,879,489 | 3/1999 | Burns et al. | 156/64 |

FOREIGN PATENT DOCUMENTS

| | | |
|---|---|---|
| 0 666 605 A1 | 8/1995 | European Pat. Off. . |
| 0 785 071 A1 | 7/1997 | European Pat. Off. . |
| 0 835 756 A2 | 4/1998 | European Pat. Off. . |

*Primary Examiner*—Lee Young
*Assistant Examiner*—A. Dexter Tugbang
*Attorney, Agent, or Firm*—Wall Marjama Bilinski & Burr

[57] ABSTRACT

A method of manufacturing an actuator including an ink pump section made by forming a spacer plate with a plurality of window portions formed therein, a closure plate stacked on one side of the spacer plate for covering the window portions and a connection plate stacked on the other side of the spacer plate for covering the above window portions. These plates are formed as laminated ceramic green sheets that are later fired to form an integrated body. A piezoelectric/electrostrictive operating section composed of electrodes and a piezoelectric/electrostrictive layer is then formed on the outer surface of the closure plate. Thereafter, the actuator is pasted to a holding adhesive film and the holding adhesive film is stripped from the actuator after subjecting the actuator to a given inspection, if necessary, or to cutting into a given shape, if necessary. Subsequently, the actuator is heat-treated. Then, onto this actuator, an ink nozzle member with a plurality of nozzle holes is stacked and joined. The ink jet print head has a strong adhesive joint between the actuator and the ink nozzle member and improved liquid resistance.

9 Claims, 4 Drawing Sheets

HEAT TREATMENT METHOD OF ACTUATORS FOR AN INK JET PRINTER HEAD AND METHOD FOR MANUFACTURING AN INK JET PRINTER HEAD

BACKGROUND OF THE INVENTION AND RELATED ART STATEMENT

The present invention relates to a heat treatment method for actuators used in ink jet printer heads and a method for manufacturing an ink jet printer head.

As shown in FIGS. 1 and 2, an ink jet printer head is so constructed by integrally joining a piezoelectric/electrostrictive film type chip 10, into which a plurality of actuators 20 are integrated with an ink nozzle member 11 having a plurality of nozzle holes 12. Ink supplied into pressure chamber 30 formed in actuator 20 is jetted through each corresponding nozzle hole 12.

The ink nozzle member 11 is constructed by laminating a thin planar nozzle plate 13, provided with a plurality of nozzle holes 12, and a similarly thin planar orifice plate 15, provided with a plurality of orifice holes 14. A flow path plate 16 is interposed between the two and all are joined with an adhesive or the like. Inside the ink nozzle member 11, an ink jet pass 17 for supplying ink to nozzle holes 12 and ink supply flow paths 18 for supplying ink to orifice holes 14 are formed. Incidentally, these ink nozzle members 11 are normally made of metal or plastics.

An actuator 20 comprises a ceramic substrate 21 and a piezoelectric/electrostrictive operating section 22 integrally formed on the ceramic substrate 21. The ceramic substrate 21 is integrally composed of a thin planar closure plate 23 and a thin planar connection plate 24 stacked together with a spacer plate 25 interposed therebetween to form an ink pump section 29. Incidentally, the closure plate 23, connection plate 24 and spacer plate 25 are respectively formed of ceramic green sheets by lamination and integrally fired to make an ink pump section. Here, in the connection plate 24, a first communicative opening 26 and a second communicative opening 27 are formed at the respective positions corresponding to the orifice hole 14 formed on orifice plate 15 of ink nozzle member 11.

In the spacer plate 25, a plurality of window sections 28 are formed, while spacer plate 25 and a connection plate 24 are stacked together so as to allow the first communicative opening 26 and a second communicative opening 27 provided on the connection plate 24 to be opened against each window section 28. The window section 28 is closed by a closure plate 23.

In this manner, the pressure chamber 30 is formed inside ceramic substrate 21.

And, on the outer surface of the closure plate 23 in the ceramic substrate 21, the respective piezoelectric/electrostrictive operating sections 22 are provided at the sites corresponding to individual pressure chambers 30. Here, piezoelectric/electrostrictive operating sections 22 each comprises a lower electrode 31, a piezoelectric/electrostrictive layer 32 and an upper electrode 33.

As described above, the ink jet printer head comprises an actuator made of a ceramic body and an ink nozzle member, both of which are normally joined by using an adhesive.

When an actuator and an ink nozzle member are joined by using an adhesive like this to manufacture an ink jet printer head, however, there has frequently occurred a situation that the actuator and the ink nozzle member are stripped off from each other at the time of use. As a result of investigation into this situation, the present inventor found that this originated in slight traces of adhesive remaining in the actuator.

Namely, after prepared as a piezoelectric/electrostrictive film type chip 10 in which a plurality of actuators 20 are integrated as shown in FIG. 2, an actuator is adhered to a holding adhesive film such as dicing film and subjected to a given inspection if necessary to clarify whether or not the actuator 20 manifests a desired performance or the like. And, after the inspection, the adhesive film is striped if necessary from an actuator cut in a given shape and then the actuator is joined to an ink nozzle member via an adhesive. However, it became clear that slight traces of adhesive of the adhesive film remained in the actuator at the time of stripping an adhesive film from the actuator, which resulted in damage to the adhesive effect of an adhesive used between the actuator and the ink nozzle member.

SUMMARY OF THE INVENTION

As a result of various examinations for removal of traces of adhesive remaining in an actuator, the present inventor found that a heat treatment at a given temperature was effective for removing of the adhesive and effective for preventing the peeling of the actuator from an ink nozzle member during use and accordingly reached the present invention.

According to the present invention, there is provided a heat treatment method for actuators of an ink jet printer head comprising the steps of preparing an actuator comprising: an ink pump section made by integrally firing of a spacer plate with a plurality of window portions formed thereon, a closure plate stacked on one side of the spacer plate for covering the above window portions and a connection plate stacked on the other side of the spacer plate for covering the above window portions formed respectively of ceramic green sheets by lamination; and a piezoelectric/electrostrictive operating section composed of electrodes and a piezoelectric/electrostrictive layer on the outer surface of the closure plate, thereafter pasting the actuator onto a holding adhesive film, stripping the holding adhesive film from the actuator after subjecting the actuator to a given inspection if necessary or to cutting into a given shape if necessary and subsequently heat treating the actuator.

In the present invention, the heat treatment is carried out preferably at least at temperatures where weight reduction of the actuator stops in a thermogravinometric (TG) analysis or the decomposition or combustion of an adhesive ends.

The heat treatment is carried out preferably by maintaining the treating temperature for more than 10 minutes at least at temperatures where weight reduction stops in the TG analysis, as seen from the result shown in Table 1 mentioned below. Since maintaining the temperature for more than 10 minutes in the atmosphere leads to a complete removal of the residual carbon after the combustion of an adhesive or a scattering of the moisture adsorbed on the actuator surface, the adhesion is stabilized. More preferably, it is desired to maintain the temperature for more than 30 minutes. However, these maintained periods are only preferable. If heat the treatment is carried out at a considerably higher temperature, its effect increases and consequently an equivalent effect can be expected even for a shorter maintained period.

Furthermore, according to the present invention, there is provided a method for manufacturing an ink jet printer head comprising the steps of preparing an actuator comprising: an ink pump section made by integrally firing a spacer plate with a plurality of window portions formed thereon, a closure plate stacked on one side of the spacer plate for covering the above window portions and a connection plate stacked on the other side of the spacer plate for covering the above window portions formed respectively of ceramic green sheets by lamination; and a piezoelectric/electrostrictive operating section composed of electrodes and a piezoelectric/electrostrictive layer on the outer surface of the above closure plate, thereafter pasting the actuator onto a holding adhesive film, stripping the holding adhesive film from the actuator after subjecting the actuator to a given inspection if necessary or to cutting into a given shape if necessary, subsequently heat-treating the actuator and then stacking and joining an ink nozzle member with a plurality of nozzle holes to the actuator.

In the present invention, it is preferred to join the actuator and the ink nozzle member with an adhesive interposed therebetween and in this case it is preferred to use a thermosetting resin adhesive as the adhesive.

To improve ink flow resistance through the actuator, it is preferable that the junctional surface of the actuators has a surface roughness Ra of 0.05 to 0.25 μm. The enhances the adhesive strength and further increases the interface distance A between the adhesive 1 and the actuator surface 2 as shown in FIG. 4.

DETAILED DESCRIPTION OF PREFERRED EMBODIMENT

The present invention is featured by heat-treating an actuator before joining the actuator and an ink nozzle member. Namely, an actuator is prepared which comprises an ink pump section made by laminating a spacer plate, a closure plate and a connection plate, respectively formed of ceramic green sheets, and integrally firing those sheets. A piezoelectric/electrostrictive operating section composed of electrodes and a piezoelectric/electrostrictive layer is formed on the outer surface of the above closure plate. Then, the actuator is pasted onto a holding adhesive film and the holding adhesive film is stripped from the actuator after subjecting the actuator to a given inspection if necessary or to cutting into a given shape if necessary. At this time, traces of adhesive from the adhesive film remains on the adhesion surface of the the actuator even after stripping the adhesive film. Thus, in the present invention, the actuator is heat-treated after stripping the adhesive film.

If the adhesive remaining on the actuator is readily combustible or removed easily, any heat treatment method may be adopted. Generally speaking, however, it is advisable to perform the heat treatment preferably for more than 30 minutes to cause the adhesive to be removed simply and surely.

Figure 3:
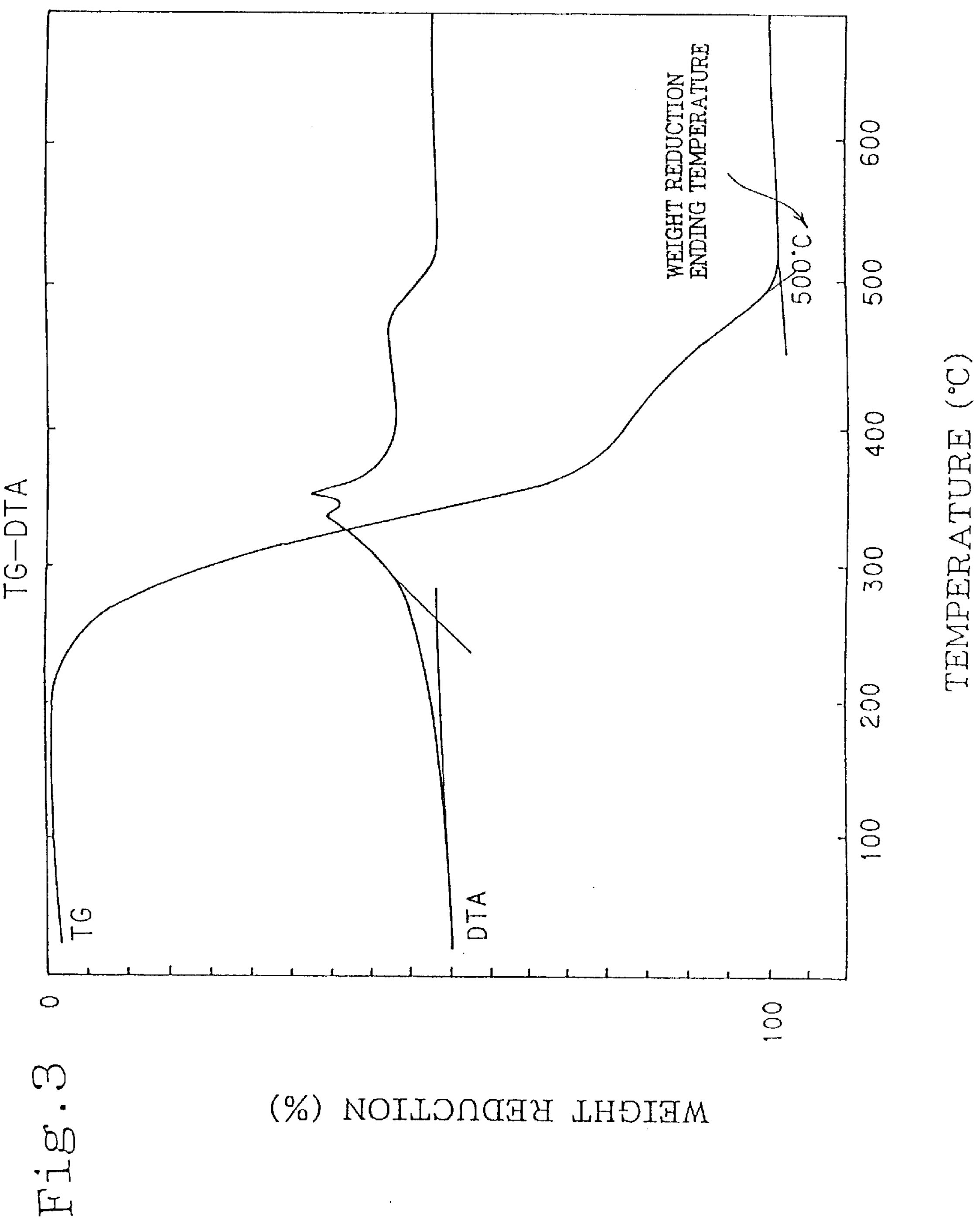
FIG. 3 is a graph showing the TG analysis data of actually used adhesives.
Figure 4:
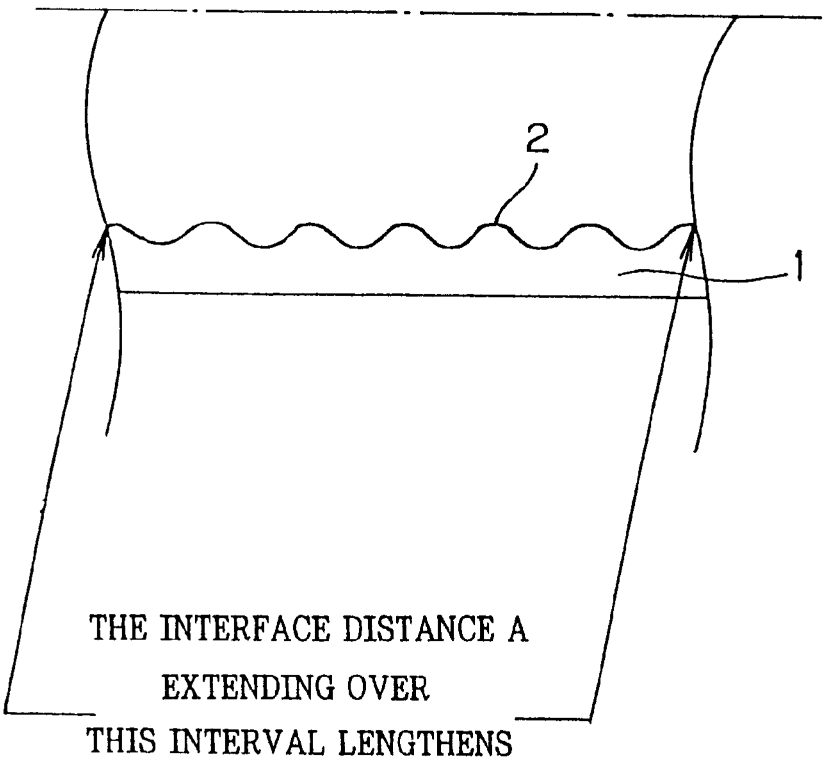
FIG. 4 is an illustration showing the interfacial distance between the adhesive and the actuator surface.

According to experiments of the present inventor, it was confirmed that, if the temperature where the weight reduction of the adhesive stops was found to be 500° C. on the TG analysis, the adhesive can be combustively removed or scattered by the heat treatment at a temperature of 500° C. or higher in atmosphere and no such problems as stripping occurs in the case of subsequently joining the actuator and an ink nozzle member by using a thermosetting resin adhesive. FIG. 3 is a graph showing an example of the temperature where the weight reduction of the adhesive stops being 500° C., based on TG analysis data of the actually employed adhesive.

In the present invention, there is no special restriction on adhesives employed for joining the actuator and the ink nozzle member, but the type of adhesives employed differs with the material of the ink nozzle member for a ceramic actuator. As ink nozzle members, those made of metal or plastics such as SUS may be used, whereas it is desired as adhesives to employ thermosetting resin adhesives such as polyester, polyamide, nylon, ethylene- acetic-vinyl, polyolefine, urethane and polyethylene for joining.

If the ink nozzle member is made of ceramics, it is preferable to employ a ceramic adhesive similar in material to the constituent of the actuator.

Furthermore, it is desired from the viewpoint of adhesion strength that the junctional surface of an actuator is somewhat rough rather than smooth. To be specific, the junctional surface of an actuator has a surface roughness Ra of preferably 0.05 to 0.25 μm and more preferably 0.07 to 0.25 μm to enhance the adhesion strength and further increase the interface distance between the adhesive and the actuator surface, improving ink flow resistance through the actuator.

It is desired that the junctional surface of an actuator has a surface roughness of not more than 0.25 μm, since adhesion strength reduces due to entrainment of bubbles in the junctional interface when the surface roughness of the junctional surface is beyond this range.

EXAMPLES

Hereinafter, referring to the examples, the present invention will be described in further detail.

Example 1

Figure 1:
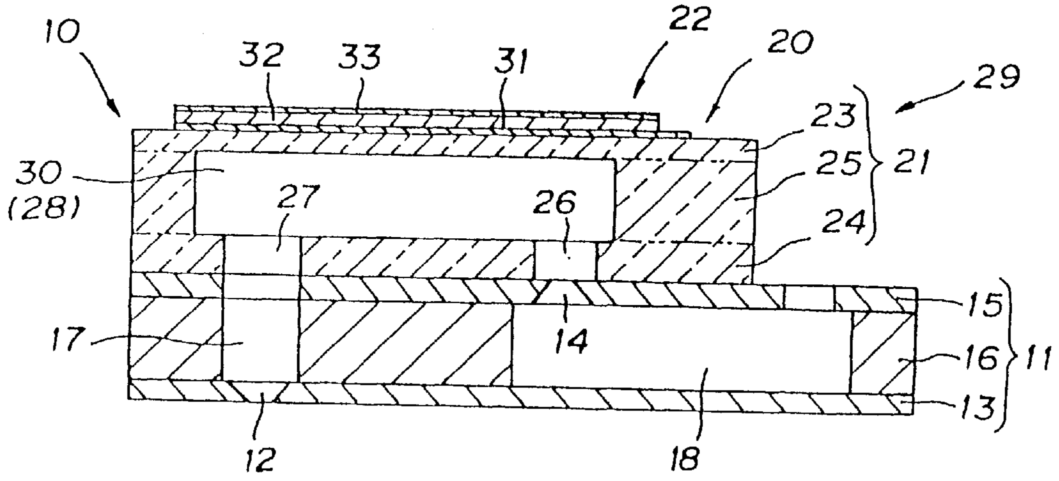
Fig.1 PRIOR ART
FIG. 1 is a sectional view showing one example of actuator.
Figure 2:
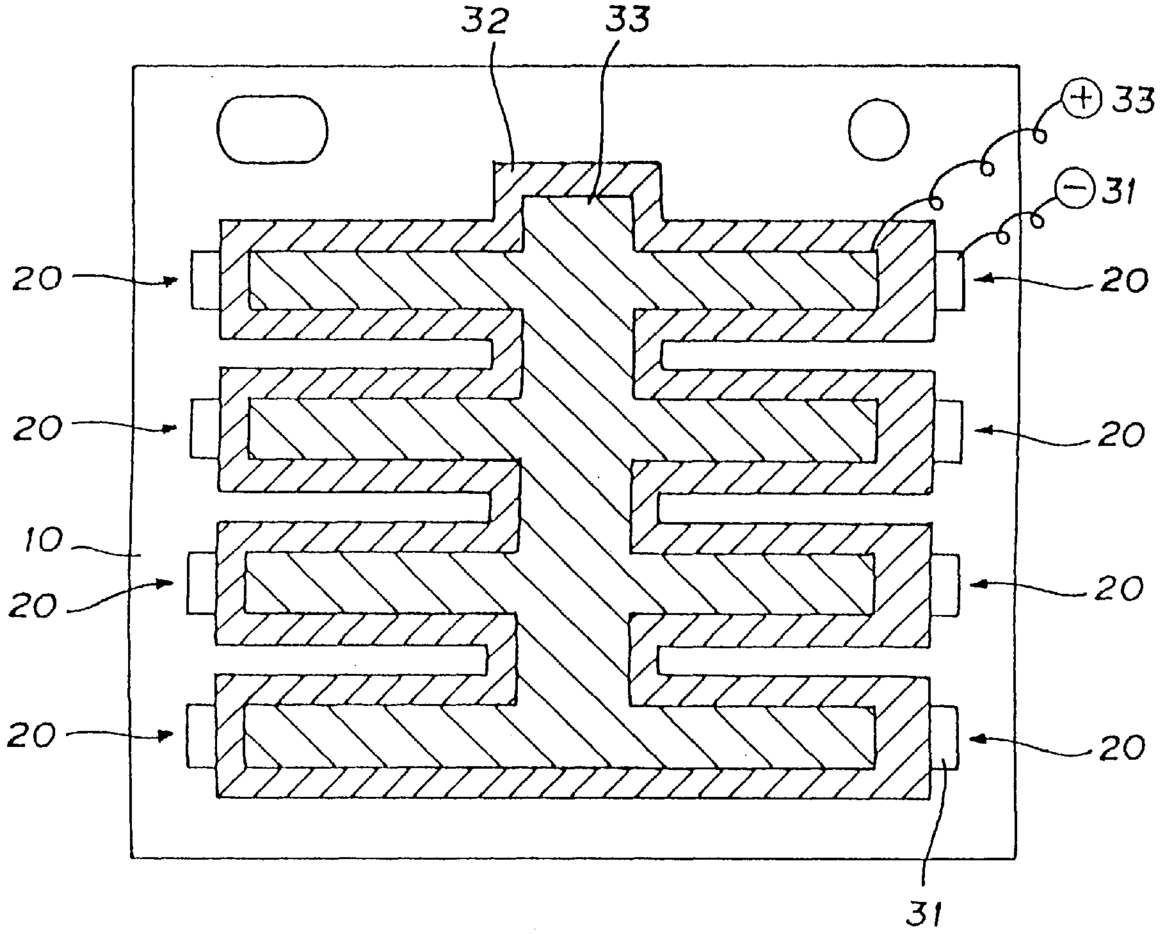
Fig.2 PRIOR ART
FIG. 2 is a plan illustration showing one example of piezoelectric/electrostrictive film type chip.

To manufacture an ink jet printer head having the configuration shown in FIG. 1, the piezoelectric/electrostrictive film type chip 10 of FIG. 2 with a plurality of actuators 20 integrated was prepared.

Next, after pasting this piezoelectric/electrostrictive film type chip to a dicing film (adhesive film) by using an adhesive of acryl resin and urethane resin, the dicing film was stripped from the piezoelectric/electrostrictive film type chip (actuator) and subjected to heat treatment. The heat treatment conditions were chosen as shown in Table 1. Incidentally, in Table 1, belt and batch signify those heat-treated in a belt furnace and in a batch furnace, respectively.

After the heat treatment, each actuator was cut out from the piezoelectric/electrostrictive film type chip and stacked on and joined to an ink nozzle member with a thermosetting resin adhesive (softening point: 100° C.) interposed therebetween. On the obtained ink jet printer head, a liquid resistance test was made.

In the liquid resistance test, the quality was judged by checking the ink leakage with the ink jet printer head dipped in an ink liquid at a given temperature for a given period of time. The result is shown in Table 1.

TABLE 1

| | Heat Treatment Conditions | | | Liquid Resistance Test Conditions | | Liquid | |
|---|---|---|---|---|---|---|---|
| No. | Temperature (° C.) | Time (min.) | Method | Temperature (° C.) | Time (hr) | Resistance Test Result | Judgment |
| 1 | 530 | 10 | belt | 60 | 120 | 4/5 | × |
| 2 | 530 | 30 | belt | 60 | 120 | 1/5 (small leakage) | Δ |
| 3 | 530 | 50 | belt | 60 | 120 | 0/5 | ○ |
| 4 | 550 | 30 | belt | 60 | 120 | 1/5 | Δ |
| 5 | 550 | 50 | belt | 60 | 120 | 0/5 | ○ |
| 6 | 570 | 30 | belt | 60 | 120 | 0/5 | ○ |
| 7 | 570 | 50 | belt | 60 | 120 | 0/5 | ○ |
| 8 | 600 | 30 | belt | 60 | 120 | 0/5 | ○ |
| 9 | 500 | 10 | batch | 60 | 120 | 4/5 | × |
| 10 | 500 | 30 | batch | 60 | 120 | 1/5 (small leakage) | Δ |
| 11 | 500 | 60 | batch | 60 | 120 | 0/5 | ○ |
| 12 | 450 | 60 | batch | 60 | 120 | 4/5 | × |

As evident from the results shown in Table 1, it was confirmed that the residual adhesive derived from the pasting of a dicing film was completely removed by the heat treatment at a temperature of 500° C. or higher for a period of time above 30 minutes in the atmosphere, thus fully manifesting an adhesion effect of the adhesive.

Example 2

After an hour heat treatment at 550° C. in the atmosphere as with Example 1 by using a piezoelectric/electrostrictive film type chip (actuator) varied in the surface roughness Ra of the junctional surface with an ink nozzle member as shown in Table 2, the ink nozzle member was joined to obtain ink jet print heads.

On these print heads, a liquid resistance test was made as with Example 1. The result is shown in Table 2.

Incidentally, the surface roughness Ra was measured with the aide of Form Talysurf-120 of Rank Taylor Bobson Co. Ltd.

TABLE 2

| | Surface | Liquid Resistance Test Conditions | | Liquid | |
|---|---|---|---|---|---|
| No. | Roughness Ra (μm) | Temperature (° C.) | Time (hr) | Resistance Test Result | Judgment |
| 13 | 0.03 | 60 | 120 | 1/5 | Δ |
| 14 | 0.03 | 60 | 120 | 0/5 | ○ |
| 15 | 0.04 | 60 | 120 | 1/10 | Δ |
| 16 | 0.04 | 60 | 120 | 0/10 | ○ |
| 17 | 0.05 | 60 | 120 | 0/5 | ○ |
| 18 | 0.05 | 60 | 120 | 0/5 | ○ |
| 19 | 0.07 | 60 | 120 | 0/5 | ○ |
| 20 | 0.10 | 60 | 120 | 0/5 | ○ |
| 21 | 0.20 | 60 | 120 | 0/5 | ○ |
| 22 | 0.25 | 60 | 120 | 0/5 | ○ |

From Table 2, it is revealed that the liquid resistance to ink was improved if the junctional surface of the actuator has a surface roughness Ra of 0.05 to 0.25 μm. On the other hand, it is also revealed that the liquid resistance to ink somewhat deteriorated if the junctional surface of an actuator has a surface roughness Ra of less than 0.05 μm.

As described above, according to the present invention, the holding adhesive film is stripped and a piezoelectric/electrostrictive film type chip (actuator) is subjected to heat treatment prior to the joining to an ink nozzle member, thereby having an advantage that a strong joining is obtained and the liquid resistance is also improved. Thus, the ink jet print head obtained according to the present invention is excellent in durability.

What is claimed is:

1. A heat treatment method for actuators of an ink jet printer head comprising the steps of:

preparing an actuator comprising an ink pump section made by integrally firing a spacer plate with a plurality of window portions formed therein, a closure plate stacked on one side of the spacer plate for covering the window portions, and a connection plate stacked on the other side of the spacer plate for covering the window portions, each formed respectively of ceramic green sheets, and a piezoelectric/electrostrictive operating section composed of electrodes and a piezoelectric/electrostrictive layer formed on the outer surface of the closure plate;

thereafter pasting the actuator onto a holding adhesive film;

stripping the holding adhesive film from the actuator; and subsequently heat-treating the actuator to remove adhesive, originating from the holding adhesive film, remaining on the actuator after stripping.

2. A heat treatment method of claim 1, wherein the heat-treating step is carried out at least at temperatures where weight reduction of the actuator stops in a thermogravinometric (TG) analysis.

3. A heat treatment method of claim 1, wherein the heat-treating step is carried out by maintaining a heat treating temperature for more than 10 minutes at least at temperatures where weight reduction of the actuator stops in a thermogravinometric (TG) analysis.

4. A method for manufacturing an ink jet print head comprising the steps of:

preparing an actuator comprising an ink pump section made by integrally firing a spacer plate with a plurality of window portions formed therein, a closure plate stacked on one side of the spacer plate for covering the window portions, and a connection plate stacked on the other side of the spacer plate for covering the window portions each formed respectively of ceramic green sheets, and a piezoelectric/electrostrictive operating section composed of electrodes and a piezoelectric/electrostrictive layer on the outer surface of the closure plate;

thereafter pasting the actuator onto a holding adhesive film;

stripping the holding adhesive film from the actuator;

subsequently heat-treating the actuator to remove adhesive, originating from the adhesive film, remaining on the actuator after stripping; and stacking and joining an ink nozzle member to the actuator.

5. A method of claim 4, wherein the actuator and the ink nozzle member are joined with a thermosetting resin adhesive interposed therebetween.

6. A method for manufacturing an ink jet print head as set forth in claim 5, wherein a junctional surface of the actuator has a surface roughness (Ra) of 0.05 to 0.25 $\mu$m.

7. A method of claim 4, wherein the heat-treating step is carried out by maintaining a heat treating temperature for more than 10 minutes at least at temperatures where weight reduction of the actuator stops in a thermogravinometric (TG) analysis.

8. A method for manufacturing an ink jet print head as set forth in claim 7, wherein a junctional surface of the actuator has a surface roughness (Ra) of 0.05 to 0.25 $\mu$m.

9. A method of claim 4, wherein a junctional surface of the actuator has a surface roughness (Ra) of 0.05 to 0.25 $\mu$m.

* * * * *